(12) United States Patent
Wada et al.

(10) Patent No.: US 11,293,702 B2
(45) Date of Patent: Apr. 5, 2022

(54) HEAT EXCHANGER AND HOT WATER APPARATUS

(71) Applicant: NORITZ CORPORATION, Hyogo (JP)

(72) Inventors: Norihide Wada, Akashi (JP); Takeshi Ohigashi, Kakogawa (JP)

(73) Assignee: NORITZ CORPORATION, Hyogo (JP)

(*) Notice: Subject to any disclaimer, the term of this patent is extended or adjusted under 35 U.S.C. 154(b) by 236 days.

(21) Appl. No.: 16/689,211

(22) Filed: Nov. 20, 2019

(65) Prior Publication Data
US 2020/0208923 A1 Jul. 2, 2020

(30) Foreign Application Priority Data

Dec. 26, 2018 (JP) .............................. JP2018-242801

(51) Int. Cl.
| F28D 1/04 | (2006.01) |
|---|---|
| F28F 1/32 | (2006.01) |
| F28D 1/053 | (2006.01) |
| F24H 1/14 | (2022.01) |

(52) U.S. Cl.
CPC ............. *F28F 1/325* (2013.01); *F24H 1/145* (2013.01); *F28D 1/05316* (2013.01)

(58) Field of Classification Search
CPC ....... F24H 1/145; F28F 1/325; F28D 1/05316
USPC .......................................................... 165/151
See application file for complete search history.

(56) References Cited

U.S. PATENT DOCUMENTS

| D916,257 S * | 4/2021 | Oohigashi | .................... D23/323 |
|---|---|---|---|
| D916,258 S * | 4/2021 | Oohigashi | .................... D23/323 |
| D917,031 S * | 4/2021 | Oohigashi | .................... D23/323 |
| 2003/0159814 A1* | 8/2003 | Sin | .......... F28F 13/04 165/151 |
| 2007/0051502 A1* | 3/2007 | Yamauchi | ............... F28F 1/128 165/151 |
| 2007/0215330 A1* | 9/2007 | Umetsu | ................... F28F 1/325 165/160 |
| 2008/0104960 A1* | 5/2008 | Lomax | ..................... F22B 37/40 60/653 |
| 2008/0156467 A1* | 7/2008 | Reinders | ............... F28D 9/0025 165/151 |
| 2008/0190588 A1* | 8/2008 | Heidenreich | ........... F28D 1/047 165/151 |
| 2011/0036551 A1* | 2/2011 | Hancock | .................. F28F 1/325 165/181 |
| 2011/0168373 A1* | 7/2011 | Kim | ........................ F28F 1/325 165/181 |
| 2015/0101362 A1* | 4/2015 | Lee | ........................ F28D 1/0535 62/515 |

(Continued)

FOREIGN PATENT DOCUMENTS

JP 2018096622 A 6/2018

*Primary Examiner* — Claire E Rojohn, III
(74) *Attorney, Agent, or Firm* — Studebaker & Brackett PC (57) ABSTRACT

A heat exchanger includes a plurality of heat transfer tubes extending in a first direction and aligned in a second direction intersecting with the first direction, and a plurality of fins disposed in the first direction. The fins each include a plurality of fin main bodies aligned in the second direction, and a bridging portion connecting two adjacent ones of the fin main bodies. At least one of the fin main bodies is provided with a through hole next to the bridging portion in the second direction.

9 Claims, 12 Drawing Sheets

(56) References Cited

U.S. PATENT DOCUMENTS

| | | | |
|---|---|---|---|
| 2015/0184927 A1* | 7/2015 | Fowler | F28D 1/0477 |
| | | | 62/276 |
| 2017/0321970 A1* | 11/2017 | Choi | F28F 9/0131 |
| 2018/0164046 A1* | 6/2018 | Oohigashi | F28F 1/325 |
| 2018/0299209 A1* | 10/2018 | Etienne | F28F 1/325 |
| 2018/0304339 A1* | 10/2018 | Ito | F28D 1/0426 |
| 2019/0154300 A1* | 5/2019 | Kondo | F23L 1/00 |
| 2019/0195563 A1* | 6/2019 | Ohigashi | F24H 1/30 |
| 2019/0368818 A1* | 12/2019 | Wada | F24H 9/146 |
| 2019/0390874 A1* | 12/2019 | Kondo | F24H 8/00 |
| 2020/0033071 A1* | 1/2020 | Kondo | F28F 9/0131 |
| 2020/0103142 A1* | 4/2020 | Se | F24H 1/41 |
| 2020/0208923 A1* | 7/2020 | Wada | F24H 8/00 |
| 2021/0156629 A1* | 5/2021 | Wada | F28F 1/30 |
| 2021/0262697 A1* | 8/2021 | Horiuchi | F28D 7/0091 |

* cited by examiner

HEAT EXCHANGER AND HOT WATER APPARATUS

BACKGROUND OF THE INVENTION

Field of the Invention

The present invention relates to a heat exchanger and a hot water apparatus.

Description of the Background Art

Japanese Patent Laying-Open No. 2018-96622 (PTL 1) describes a heat exchanger. The heat exchanger described in PTL 1 includes a heat transfer tube and a fin. A plurality of heat transfer tubes extend in a first direction, and are aligned in a single row in a second direction intersecting with the first direction.

The fin includes a portion (hereinafter referred as a fin main body) extending in a plane intersecting with the first direction so as to project from an outer circumferential surface of the heat transfer tube. The fin main body is provided with an insertion hole through which the heat transfer tube is inserted. The fin main body is attached to the heat transfer tube by the insertion of the heat transfer tube in the insertion hole. Two fin main bodies disposed adjacent to each other are connected to each other (this connection portion is hereinafter referred as a bridging portion).

SUMMARY OF THE INVENTION

In the heat exchanger described in PTL 1, the bridging portion is heated and thermally expands by combustion gas emitted from a burner. This thermal expansion causes thermal stress to occur in the heat transfer tube.

The present invention was made in view of the problem with conventional techniques as described above. More specifically, the present invention provides a heat exchanger and a hot water apparatus capable of reducing thermal stress that occurs in a heat transfer tube due to thermal expansion of a bridging portion.

A heat exchanger according to one aspect of the present invention includes a plurality of heat transfer tubes extending in a first direction and aligned in a second direction intersecting with the first direction, and a plurality of fins disposed in the first direction. The fins each include a plurality of fin main bodies aligned in the second direction, and a bridging portion connecting two adjacent ones of the fin main bodies. At least one of the fin main bodies is provided with a through hole next to the bridging portion in the second direction.

In the heat exchanger, the fin main body tends to deform around the through hole, so that thermal expansion of the bridging portion is less likely to be transmitted to the heat transfer tube. According to the heat exchanger, therefore, thermal stress that occurs in the heat transfer tube due to the thermal expansion of the bridging portion can be reduced.

In the heat exchanger, a pair of the through holes may be formed to face each other with the bridging portion interposed therebetween in the second direction.

In this case, the through holes are formed on opposing sides of the bridging portion, so that the deformation tends to occur at portions on opposing sides of the bridging portion. In this case, therefore, the thermal expansion of the bridging portion is even less likely to be transmitted to the heat transfer tube, so that the thermal stress that occurs in the heat transfer tube can be further reduced.

In the heat exchanger, a width of the through hole in a third direction intersecting with the first direction and the second direction may be greater than a width of the bridging portion in the third direction.

In this case, the thermal stress that occurs in the heat transfer tube due to the thermal expansion of the bridging portion can be further reduced.

In the heat exchanger, the through hole may be in the form of a slit extending in the third direction.

In the heat exchanger, ends of the through hole in the third direction may be curved when viewed in the first direction. The curves may be convex toward an outer side of the through hole.

In this case, stress concentration at the ends of the through hole is relaxed. Thus, when the fin main body around the through hole deforms due to the thermal expansion of the bridging portion, cutting of the fin main body around the through hole can be suppressed.

In the heat exchanger, the through hole may be in a circular shape or an elliptical shape.

In the heat exchanger, a pair of the through holes may be formed to face each other with a first bridging portion interposed therebetween, the first bridging portion being the bridging portion located closest to one end of the fin in the second direction, and a pair of the through holes may be formed to face each other with a second bridging portion interposed therebetween, the second bridging portion being the bridging portion located closest to the other end of the fin in the second direction. The through hole may not be formed next to the bridging portion other than the first bridging portion and the second bridging portion.

In this case, the thermal stress that occurs in the heat transfer tube due to the thermal expansion of the bridging portion can be reduced, while a reduction in heat transfer efficiency resulting from the formation of the through hole is suppressed.

A hot water apparatus according to one aspect of the present invention includes the heat exchanger, and a burner that generates combustion gas subjected to heat exchange by the heat exchanger.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described in detail with reference to the drawings. The same or corresponding parts are denoted by the same reference characters in the following drawings, and redundant description is not repeated.

Construction of Hot Water Apparatus According to Embodiment

A construction of a hot water apparatus according to the embodiment will now be described.

Figure 1:
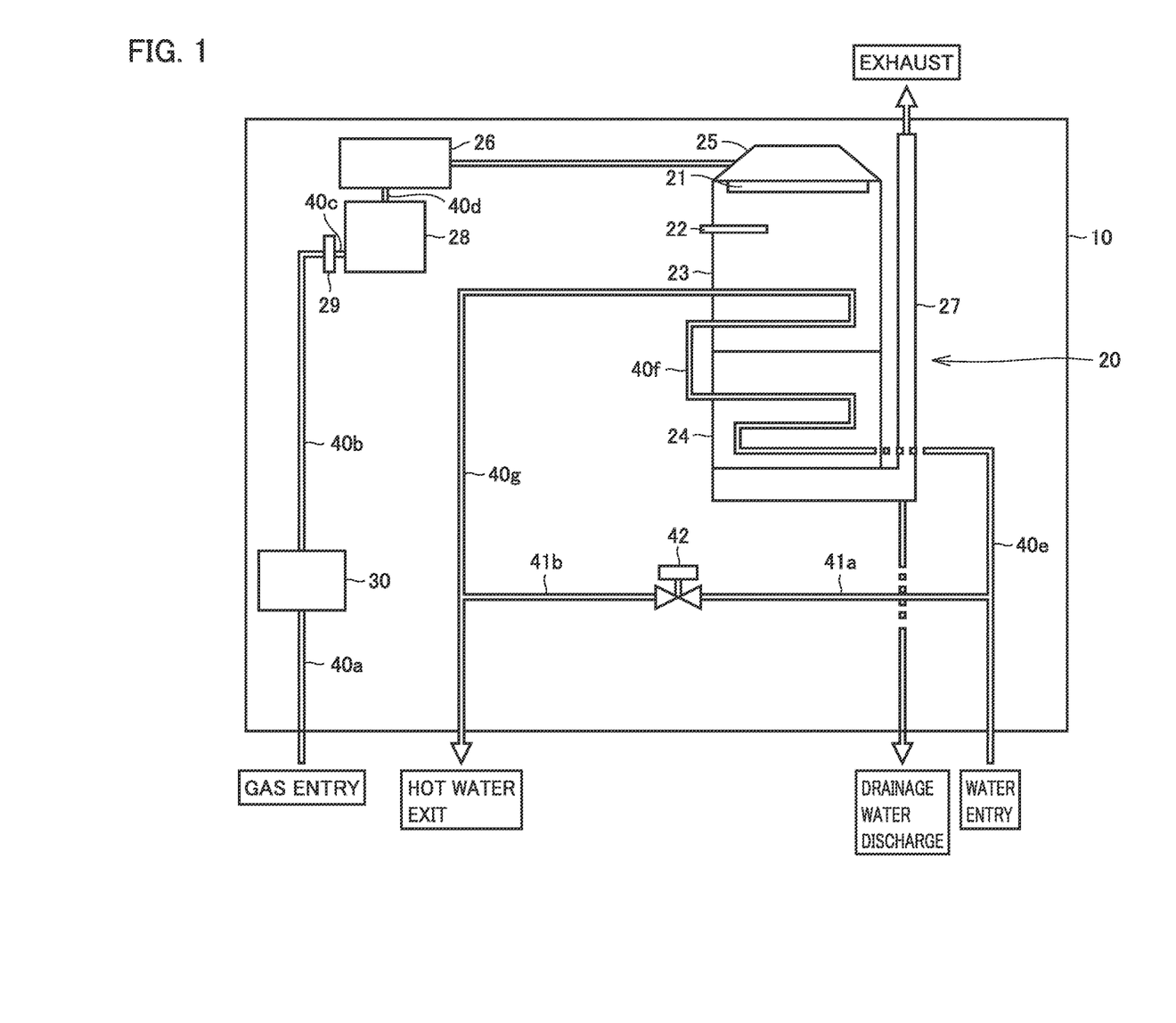
FIG. 1 is a schematic diagram of a hot water apparatus according to an embodiment.

As shown in FIG. 1, the hot water apparatus according to the embodiment includes a housing 10, a combustion apparatus 20, a pipe 40a to a pipe 40g, a bypass pipe 41a and a bypass pipe 41b, and a bypass servo 42.

Combustion apparatus 20 includes a burner 21, an ignition plug 22, a primary heat exchanger 23, a secondary heat exchanger 24, a chamber 25, a fan 26, a duct 27, a venturi 28, an orifice 29, and a gas valve 30.

Burner 21, ignition plug 22, primary heat exchanger 23, secondary heat exchanger 24, chamber 25, fan 26, duct 27, venturi 28, orifice 29, gas valve 30, pipe 40a to pipe 40g, bypass pipe 41a, bypass pipe 41b and bypass servo 42 are disposed in housing 10.

Burner 21 is disposed below chamber 25. Primary heat exchanger 23 is disposed below burner 21. Ignition plug 22 is disposed below burner 21. Ignition plug 22 is attached to primary heat exchanger 23, for example. Secondary heat exchanger 24 is disposed below primary heat exchanger 23.

Pipe 40a has one end from which fuel gas is supplied. Pipe 40a has the other end connected to gas valve 30. Pipe 40b has one end connected to gas valve 30. Pipe 40b has the other end connected to orifice 29. Pipe 40c has one end connected to orifice 29. Pipe 40c has the other end connected to venturi 28.

Pipe 40d has one end connected to venturi 28. Pipe 40d has the other end connected to fan 26. Fan 26 is connected to chamber 25.

Pipe 40e has one end from which water is supplied. Pipe 40e has the other end connected to secondary heat exchanger 24. Pipe 40f has one end connected to secondary heat exchanger 24. Pipe 40f has the other end connected to primary heat exchanger 23. Pipe 40g has one end connected to primary heat exchanger 23. Pipe 40g has the other end from which hot water exits.

Bypass pipe 41a has one end connected to pipe 40e. Bypass pipe 41a has the other end connected to bypass servo 42. Bypass pipe 41b has one end connected to bypass servo 42. Bypass pipe 41b has the other end connected to pipe 40g.

Gas valve 30 switches supply and stop of the fuel gas from pipe 40a. The pressure of the fuel gas supplied to venturi 28 is thereby regulated.

Venturi 28 is configured to take in air from the outside of housing 10. Venturi 28 mixes the air taken in from the outside of housing 10 with the fuel gas supplied to venturi 28 through pipe 40a, pipe 40b, pipe 40c, orifice 29 and gas valve 30 (the fuel gas mixed with the air is hereinafter referred to as mixed gas).

Fan 26 includes a fan case, an impeller disposed in the fan case, and a motor for driving the impeller to rotate. When the motor drives the impeller to rotate, fan 26 suctions the mixed gas produced at venturi 28 through pipe 40d. The suctioned mixed gas is supplied to burner 21 through chamber 25.

The mixed gas is ejected downward through burner ports provided in a lower surface of burner 21. The ejected mixed gas is burned by being ignited by ignition plug 22, and turned into combustion gas. The combustion gas is ejected downward (i.e., toward primary heat exchanger 23).

The water supplied to secondary heat exchanger 24 through pipe 40e exchanges heat with latent heat of the combustion gas at secondary heat exchanger 24, to thereby have an increased temperature. The water that has passed through secondary heat exchanger 24 is supplied to primary heat exchanger 23 through pipe 40f. The water supplied to primary heat exchanger 23 exchanges heat with sensible heat of the combustion gas at primary heat exchanger 23, to thereby have a further increased temperature. The water that has passed through primary heat exchanger 23 flows through pipe 40g.

Part of the water flowing through pipe 40e flows to bypass pipe 41a. A flow rate of water flowing from bypass pipe 41a to bypass pipe 41b is controlled by bypass servo 42. The water flowing through bypass pipe 41b is mixed with the water flowing through pipe 40g. That is, the temperature of the water exiting from the other end of pipe 40g is adjusted by bypass servo 42 controlling the flow rate of the water flowing from bypass pipe 41a to bypass pipe 41b.

Water produced by condensation of water vapor in the combustion gas in primary heat exchanger 23 (this water is hereinafter referred to as drainage water) is discharged to the outside of housing 10 through duct 27.

Detailed Construction of Primary Heat Exchanger

A detailed construction of primary heat exchanger 23 will now be described.

Figure 2:
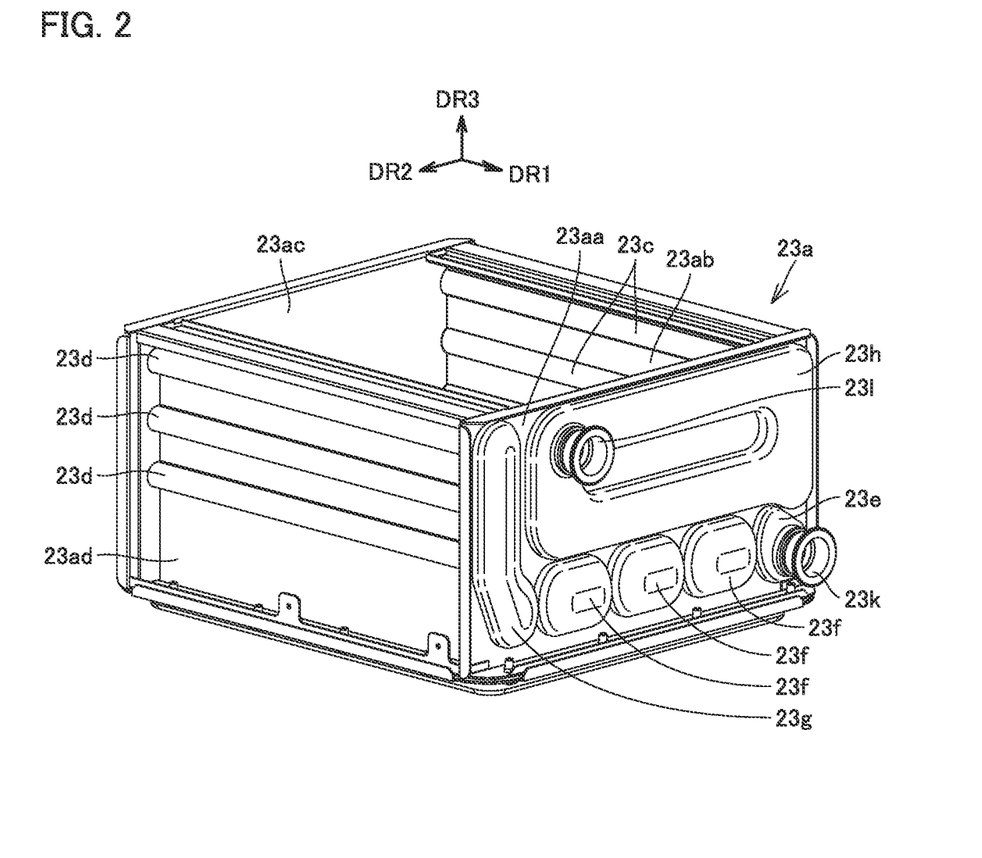
FIG. 2 is a perspective view of a primary heat exchanger 23.
Figure 3:
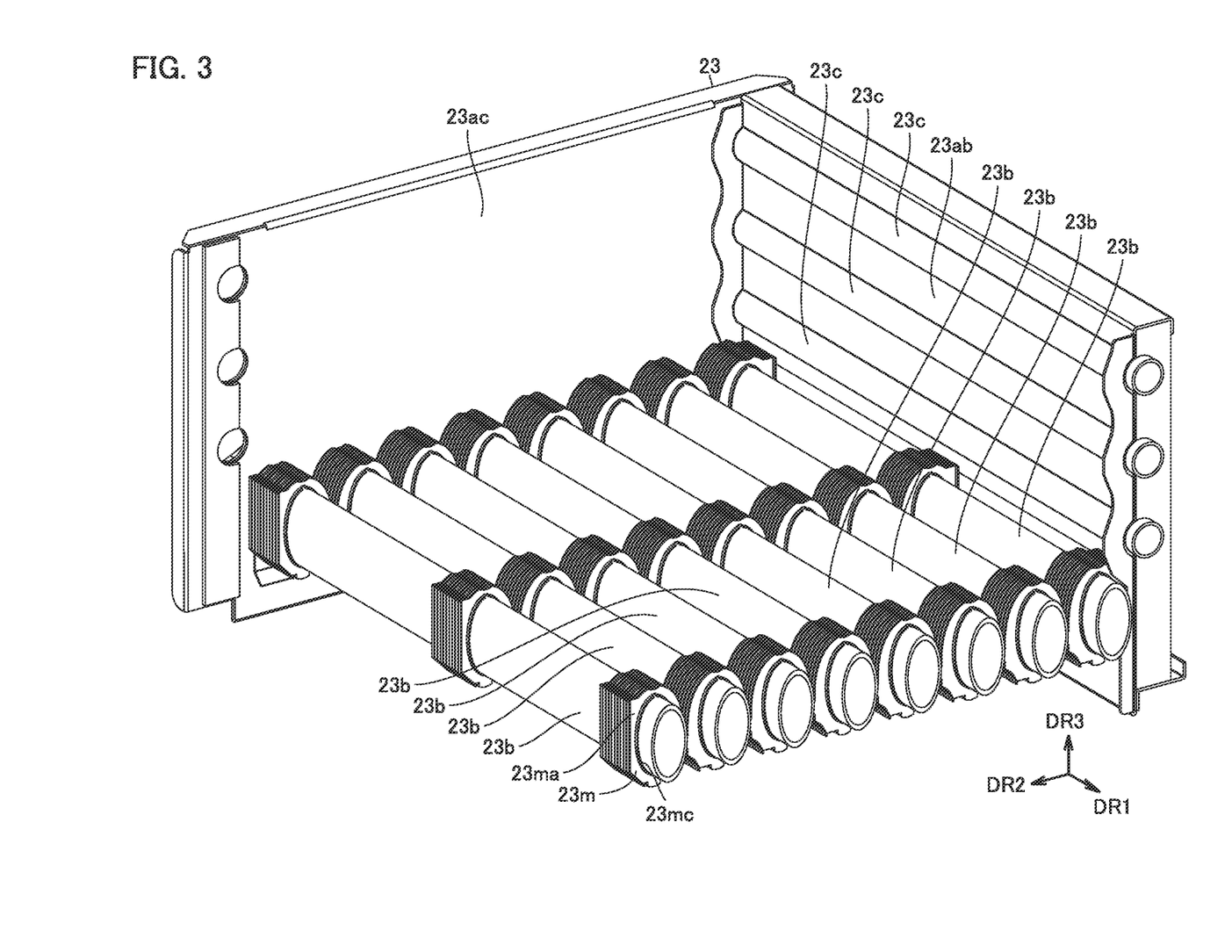
FIG. 3 is a perspective view showing an internal construction of primary heat exchanger 23.
Figure 4:
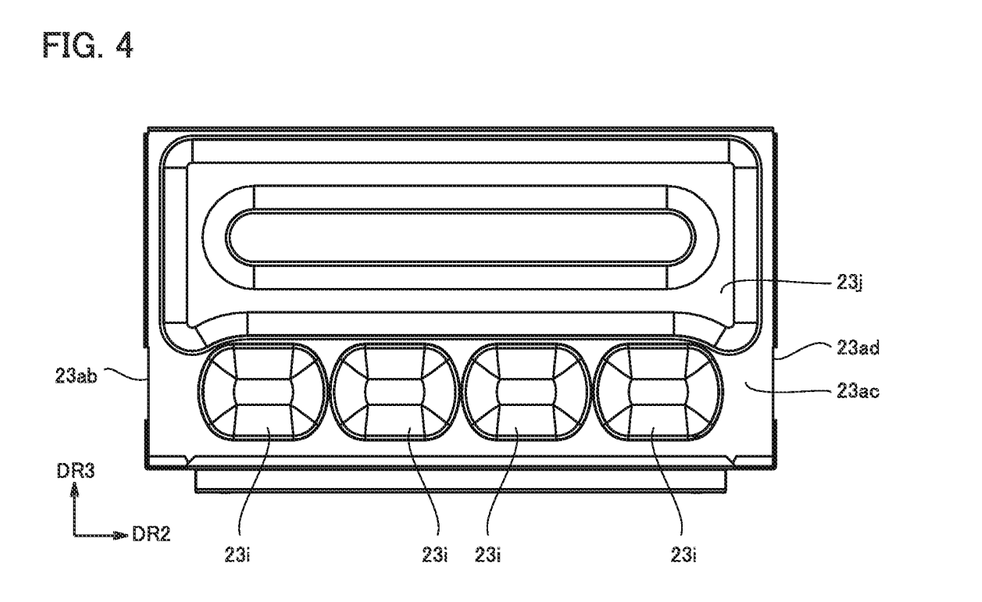
FIG. 4 is a side view of primary heat exchanger 23.

As shown in FIGS. 2 to 4, primary heat exchanger 23 includes a housing 23a, heat transfer tubes 23b to heat transfer tubes 23d, a header 23e to a header 23j, a water inlet 23k, a water outlet 23l, and fins 23m. Some of fins 23m are not shown in FIG. 3.

Housing 23a includes a sidewall 23aa to a sidewall 23ad. Sidewall 23aa and sidewall 23ac face each other in a first direction DR1. Sidewall 23ab and sidewall 23ad face each other in a second direction DR2. First direction DR1 and second direction DR2 intersect with each other. Preferably, first direction DR1 and second direction DR2 are orthogonal to each other.

Sidewall 23ab is continuous with sidewall 23aa and sidewall 23ac. Sidewall 23ad is continuous with sidewall 23aa and sidewall 23ac. An upper surface of housing 10 is provided with an opening bounded by upper ends of sidewall 23aa to sidewall 23ad, and a lower surface of housing 10 is provided with an opening bounded by lower ends of sidewall 23aa to sidewall 23ad. The combustion gas emitted from burner 21 enters primary heat exchanger 23 through the opening in the upper surface of housing 10, and is discharged through the opening in the lower surface of housing 10.

Each heat transfer tube 23b is fixed at one end to an inner wall surface of sidewall 23aa, and fixed at the other end to an inner wall surface of sidewall 23ac. The inner wall surface of sidewall 23*aa* refers to a surface of sidewall 23*aa* that faces sidewall 23*ac*, and the inner wall surface of sidewall 23*ac* refers to a surface of sidewall 23*ac* that faces sidewall 23*aa*.

Heat transfer tube 23*b* extends in first direction DR1. Heat transfer tube 23*b* is in an elliptic cylindrical shape, for example. A plurality of heat transfer tubes 23*b* are aligned in a single row in second direction DR2. There are eight heat transfer tubes 23*b* in the example shown in the figure. Two adjacent heat transfer tubes 23*b* are aligned at a distance from each other.

Each heat transfer tube 23*c* is fixed at one end to the inner wall surface of sidewall 23*aa*, and fixed at the other end to the inner wall surface of sidewall 23*ac*. Heat transfer tube 23*c* extends in first direction DR1. A plurality of heat transfer tubes 23*c* are aligned at a distance from one another in a third direction DR3 on an outer wall surface of sidewall 23*ab*. Third direction DR3 is a direction intersecting with first direction DR1 and second direction DR2. Preferably, third direction DR3 is orthogonal to first direction DR1 and second direction DR2. The outer wall surface of sidewall 23*ab* refers to a surface of sidewall 23*ab* that faces away from sidewall 23*ad*. There are three heat transfer tubes 23*c* in the example shown in the figure.

Each heat transfer tube 23*d* is fixed at one end to the inner wall surface of sidewall 23*aa*, and fixed at the other end to the inner wall surface of sidewall 23*ac*. Heat transfer tube 23*d* extends in first direction DR1. A plurality of heat transfer tubes 23*d* are aligned at a distance from one another in third direction DR3 on an outer wall surface of sidewall 23*ad*. The outer wall surface of sidewall 23*ad* refers to a surface of sidewall 23*ad* that faces away from sidewall 23*ab*. There are three heat transfer tubes 23*d* in the example shown in the figure.

Header 23*e* to header 23*h* are attached to an outer wall surface of sidewall 23*aa*. The outer wall surface of sidewall 23*aa* refers to a surface of sidewall 23*aa* opposite to the inner wall surface of sidewall 23*aa*. Header 23*e* is connected to one end of heat transfer tube 23*b* located closest to sidewall 23*ab*. Each header 23*f* is connected to respective one ends of two adjacent heat transfer tubes 23*b*. Header 23*g* is connected to one end of heat transfer tube 23*b* located closest to sidewall 23*ad* and one ends of heat transfer tubes 23*d*. Header 23*h* is connected to one ends of heat transfer tubes 23*c*.

Headers 23*i* and header 23*j* are attached to an outer wall surface of sidewall 23*ac*. The outer wall surface of sidewall 23*ac* refers to a surface of sidewall 23*ac* opposite to the inner wall surface of sidewall 23*ac*. Each header 23*i* is connected to respective other ends of two adjacent heat transfer tubes 23*b*. Header 23*j* is connected to the other ends of heat transfer tubes 23*c* and the other ends of heat transfer tubes 23*d*.

Water inlet 23*k* is connected to header 23*e*. Water outlet 23*l* is connected to header 23*h*. Although not shown, the other end of pipe 40*f* is connected to header 23*e*, and one end of pipe 40*g* is connected to water outlet 23*l*.

Figure 5:
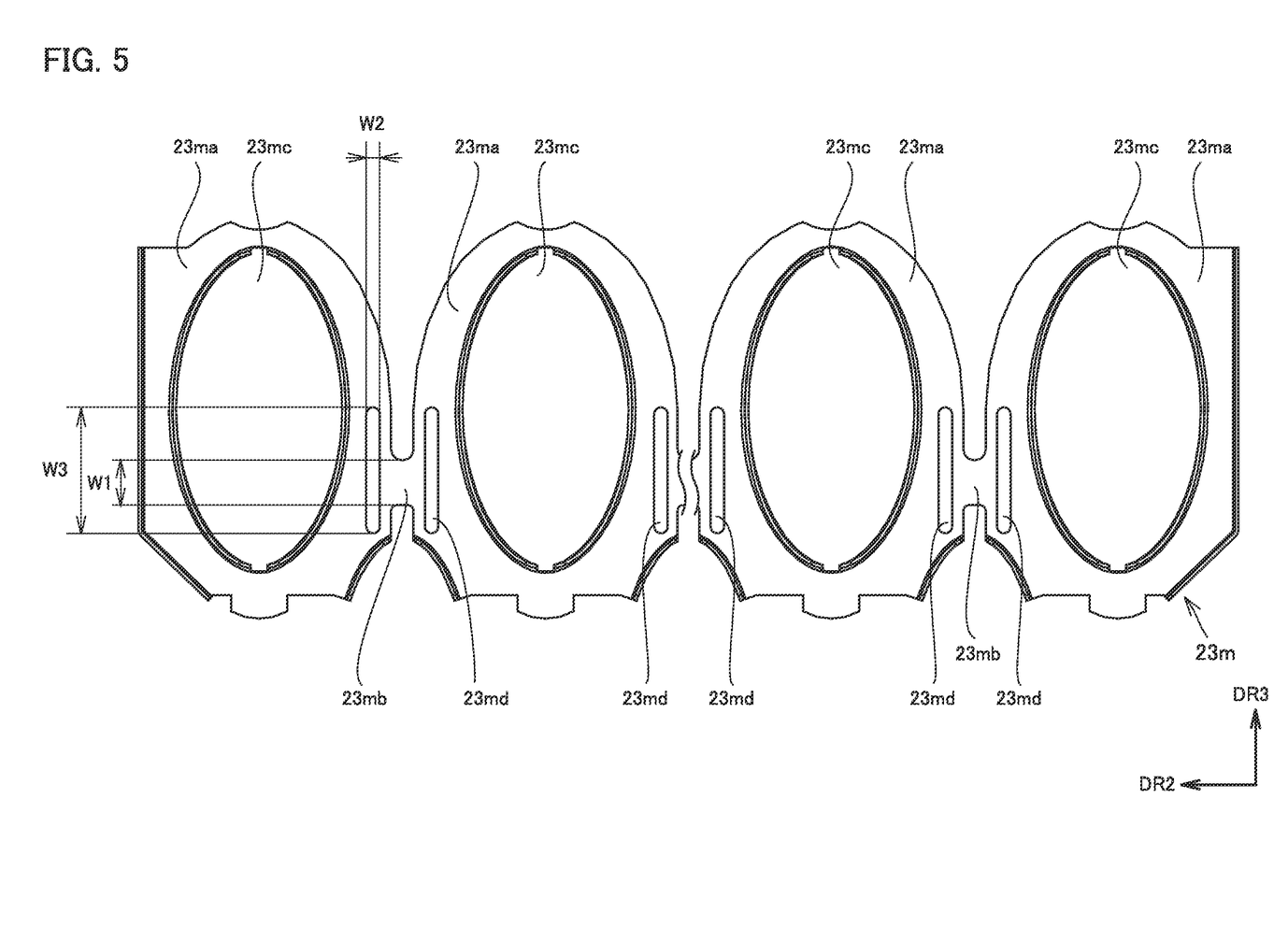
FIG. 5 is a plan view of a fin 23$m$.

As shown in FIG. 3, the plurality of fins 23*m* are disposed in first direction DR1. Fin 23*m* is made of stainless steel, for example. As shown in FIG. 5, fin 23*m* includes a plurality of fin main bodies 23*ma*, and one or more bridging portions 23*mb* (when there are two fin main bodies 23*ma*, there is one bridging portion 23*mb*). Fin main body 23*ma* is a portion extending in a plane intersecting with first direction DR1 so as to project from an outer circumferential surface of heat transfer tube 23*b*. Fin main bodies 23*ma* are aligned in second direction DR2. Bridging portion 23*mb* is a portion connecting two adjacent fin main bodies 23*ma*. Bridging portion 23*mb* is interposed between notches from opposing sides in third direction DR3. Bridging portion 23*mb* is positioned to overlap heat transfer tubes 23*b* in third direction DR3. Bridging portion 23*mb* has a width W1 in third direction DR3.

Fin main body 23*ma* is provided with an insertion hole 23*mc*. Insertion hole 23*mc* passes through fin main body 23*ma* in a thickness direction. Insertion hole 23*mc* is in an elliptical shape, for example, when viewed in first direction DR1. Heat transfer tube 23*b* is inserted in insertion hole 23*mc*. Fin main body 23*ma* is brazed to the outer circumferential surface of heat transfer tube 23*b* while heat transfer tube 23*b* is inserted in insertion hole 23*mc*. Heat conduction between fin 23*m* and heat transfer tube 23*b* is thereby allowed.

Fin main body 23*ma* is provided with a through hole 23*md*. Through hole 23*md* passes through fin main body 23*ma* in the thickness direction. Through hole 23*md* is preferably in the form of a slit extending in third direction DR3. Through hole 23*md* has a width W2 in second direction DR2, and has a width W3 in third direction DR3. Width W2 is preferably smaller than width W3. It should be noted that "through hole 23*md* is in the form of a slit" also includes the case where width W2 is so small that through hole 23*md* is substantially in the form of a line. Ends of through hole 23*md* in third direction DR3 are preferably curved when viewed in first direction DR1. These curves are convex toward the outer side of through hole 23*md*. Width W3 is preferably greater than width W1.

Through hole 23*md* is formed in fin main body 23*ma* next to bridging portion 23*mb* in second direction DR2. A pair of through holes 23*md* are preferably formed to face each other with bridging portion 23*mb* interposed therebetween. It is only required that at least one of fin main bodies 23*ma* be provided with through hole 23*md* next to bridging portion 23*mb* in second direction DR2.

Water supplied from water inlet 23*k* is supplied to heat transfer tube 23*b* through header 23*e*, and successively flows through heat transfer tube 23*b*. The water that has passed through heat transfer tube 23*b* is supplied to heat transfer tube 23*d*, and flows through heat transfer tube 23*d*. The water that has passed through heat transfer tube 23*d* is supplied to heat transfer tube 23*c*, and flows through heat transfer tube 23*c*. The water that has passed through heat transfer tube 23*c* exits from water outlet 23*l* through header 23*h*. The water exchanges heat, while flowing through heat transfer tube 23*b*, with fin 23*m* heated by the combustion gas generated at burner 21. The water also exchanges heat, while flowing through heat transfer tube 23*c* and heat transfer tube 23*d*, with the combustion gas generated at burner 21.

Effects of Primary Heat Exchanger According to Embodiment

Effects of primary heat exchanger 23 will now be described in comparison with a comparative example.

Figure 6:
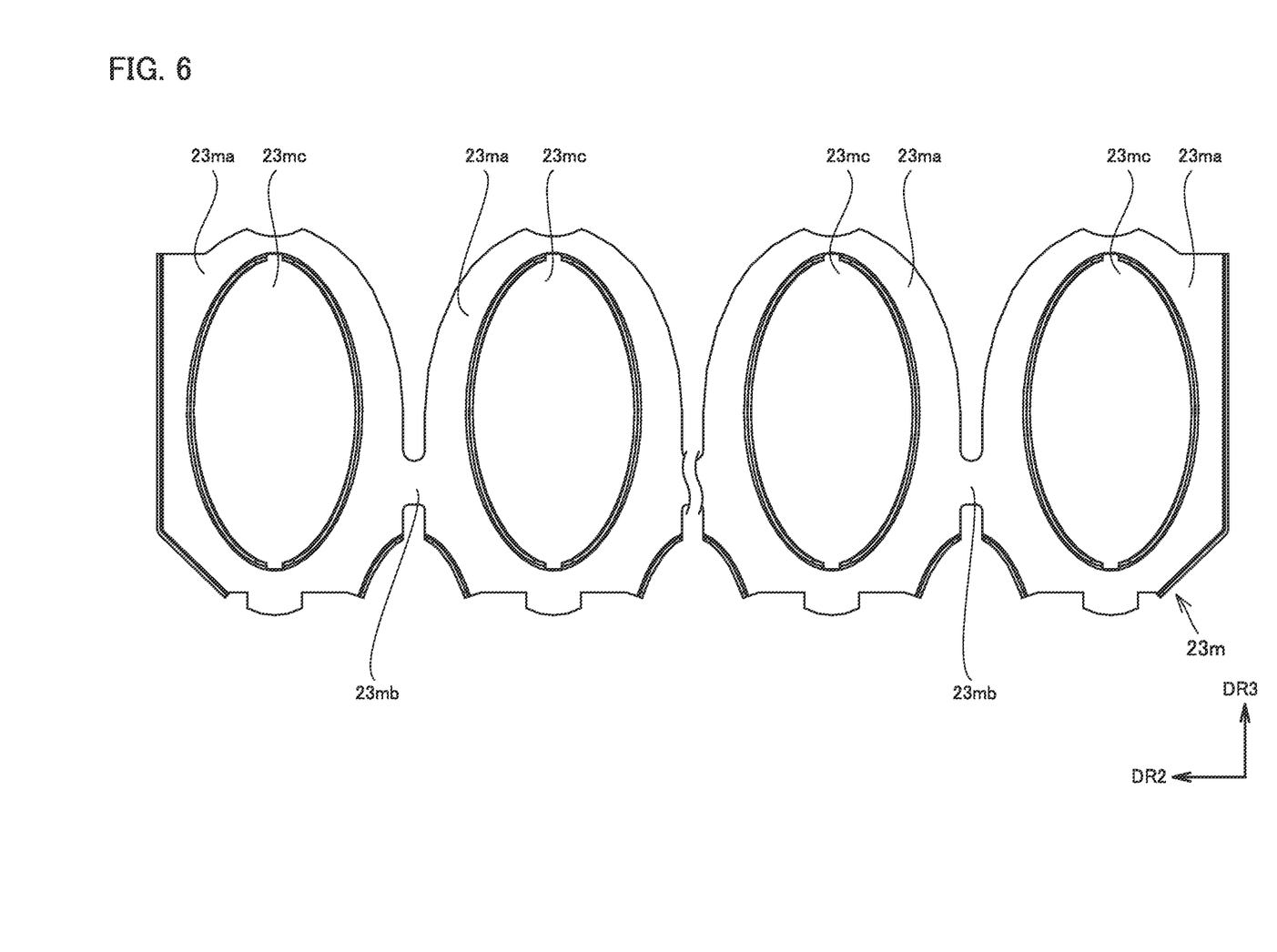
FIG. 6 is a plan view of fin 23$m$ in a primary heat exchanger according to a comparative example.

A primary heat exchanger according to the comparative example is identical in construction to primary heat exchanger 23, except for the construction of fin 23*m*. As shown in FIG. 6, fin main body 23*ma* is not provided with through hole 23*md* in the primary heat exchanger according to the comparative example.

Figure 7:
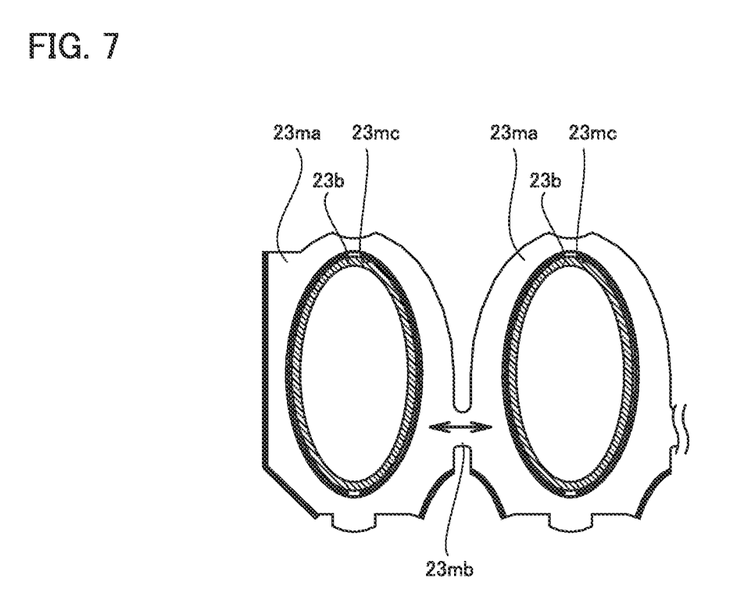
FIG. 7 is a schematic diagram showing a mechanism by which thermal stress caused by thermal expansion of a bridging portion 23$mb$ acts on a heat transfer tube 23$b$ in the heat exchanger according to the comparative example.

As shown in FIG. 7, bridging portion 23*mb* of fin 23*m* is heated by the combustion gas emitted from burner 21 and thereby thermally expands (see arrows in the figure). In the primary heat exchanger according to the comparative example, since fin main body 23ma is not provided with through hole 23md, the thermal expansion of bridging portion 23mb acts on heat transfer tube 23b. Since heat transfer tube 23b has one end fixed to sidewall 23aa, when the thermal expansion of bridging portion 23mb acts on heat transfer tube 23b, thermal stress tends to occur at a fixed portion of heat transfer tube 23b and sidewall 23aa. This thermal stress may cause a breakage of the fixed portion of heat transfer tube 23b and sidewall 23aa.

In contrast, in primary heat exchanger 23, fin main body 23ma is provided with through hole 23md, and fin main body 23ma around the through hole tends to deform. Thus, if bridging portion 23mb thermally expands by being heated with the combustion gas, the thermal expansion is less likely to be transmitted to heat transfer tube 23b. As a result, in primary heat exchanger 23, thermal stress that occurs in heat transfer tube 23b is reduced.

To avoid the application of the thermal stress to heat transfer tube 23b due to the thermal expansion of bridging portion 23mb, it is conceivable to remove bridging portion 23mb from fin 23m. The removal of bridging portion 23mb from fin 23m, however, results in separation of respective fin main bodies 23ma, and therefore results in an increased workload during assembly of fins 23m to heat transfer tubes 23b. In primary heat exchanger 23, respective fin main bodies 23ma are integrated together by bridging portions 23mb, thereby not causing an increase in workload during assembly of fins 23m to heat transfer tubes 23b.

In primary heat exchanger 23, the pair of through holes 23md are formed to face each other with bridging portion 23mb interposed therebetween, so that the deformation tends to occur at portions on opposing sides of bridging portion 23mb. According to primary heat exchanger 23, therefore, the thermal expansion of bridging portion 23mb is even less likely to be transmitted to heat transfer tube 23b, so that the thermal stress that occurs in heat transfer tube 23b can be further reduced.

In primary heat exchanger 23, the ends of through hole 23md in third direction DR3 are curved when viewed in first direction DR1, and these curves are convex toward the outer side of the through hole, so that there are few spots of stress concentration in the vicinity of the ends of through hole 23md. According to primary heat exchanger 23, therefore, when fin main body 23ma around through hole 23md deforms due to the thermal expansion of bridging portion 23mb, cutting of fin main body 23ma around through hole 23md can be suppressed.

Variations

Constructions of fins 23m according to variations will now be described.

Figure 8:
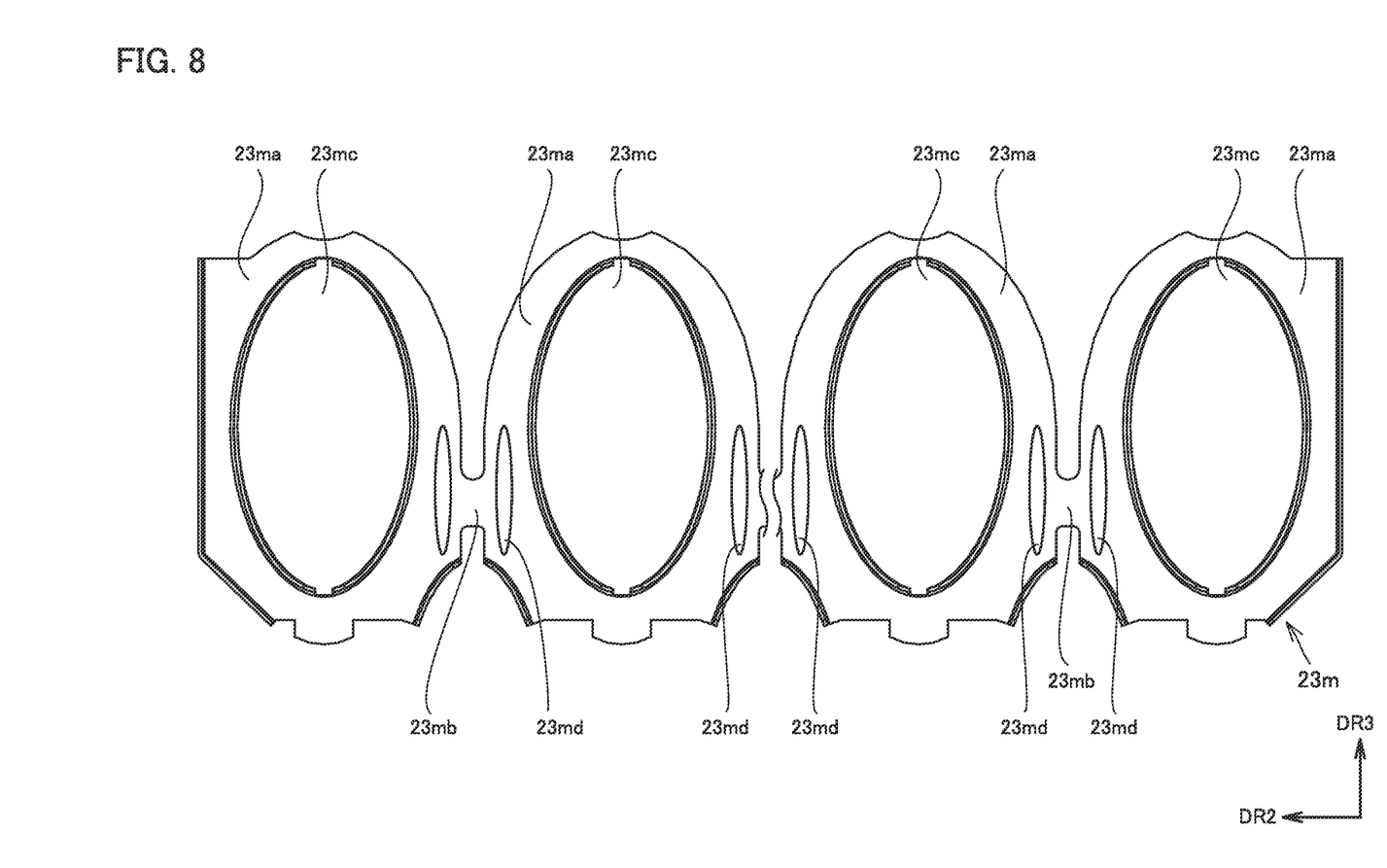
FIG. 8 is a plan view of fin 23$m$ according to a first variation.
Figure 9:
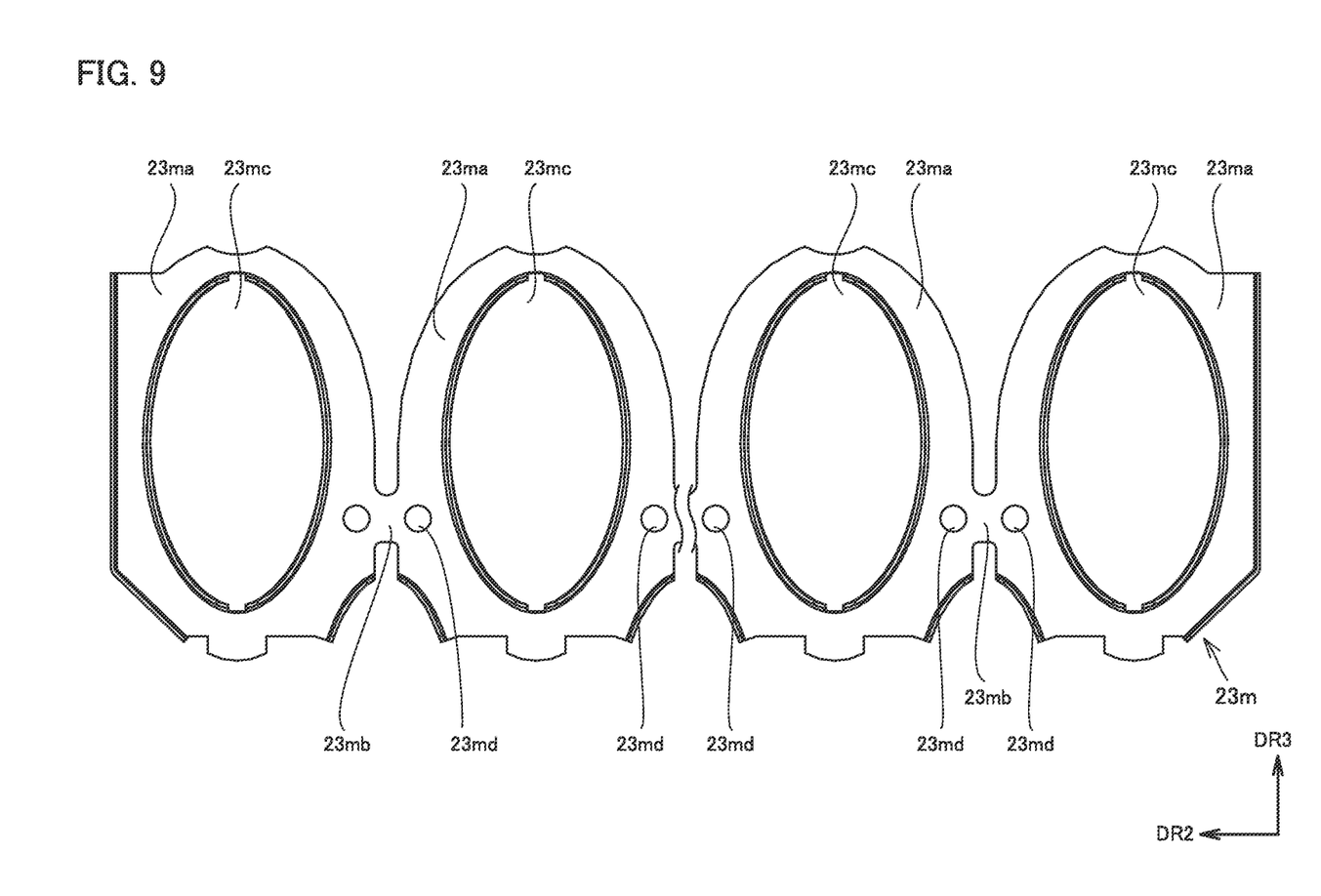
FIG. 9 is a plan view of fin 23$m$ according to a second variation.

As shown in FIG. 8, through hole 23md may be in an elliptical shape. A major axis of this elliptical shape is in third direction DR3. As shown in FIG. 9, through hole 23md may be in a circular shape.

Figure 10:
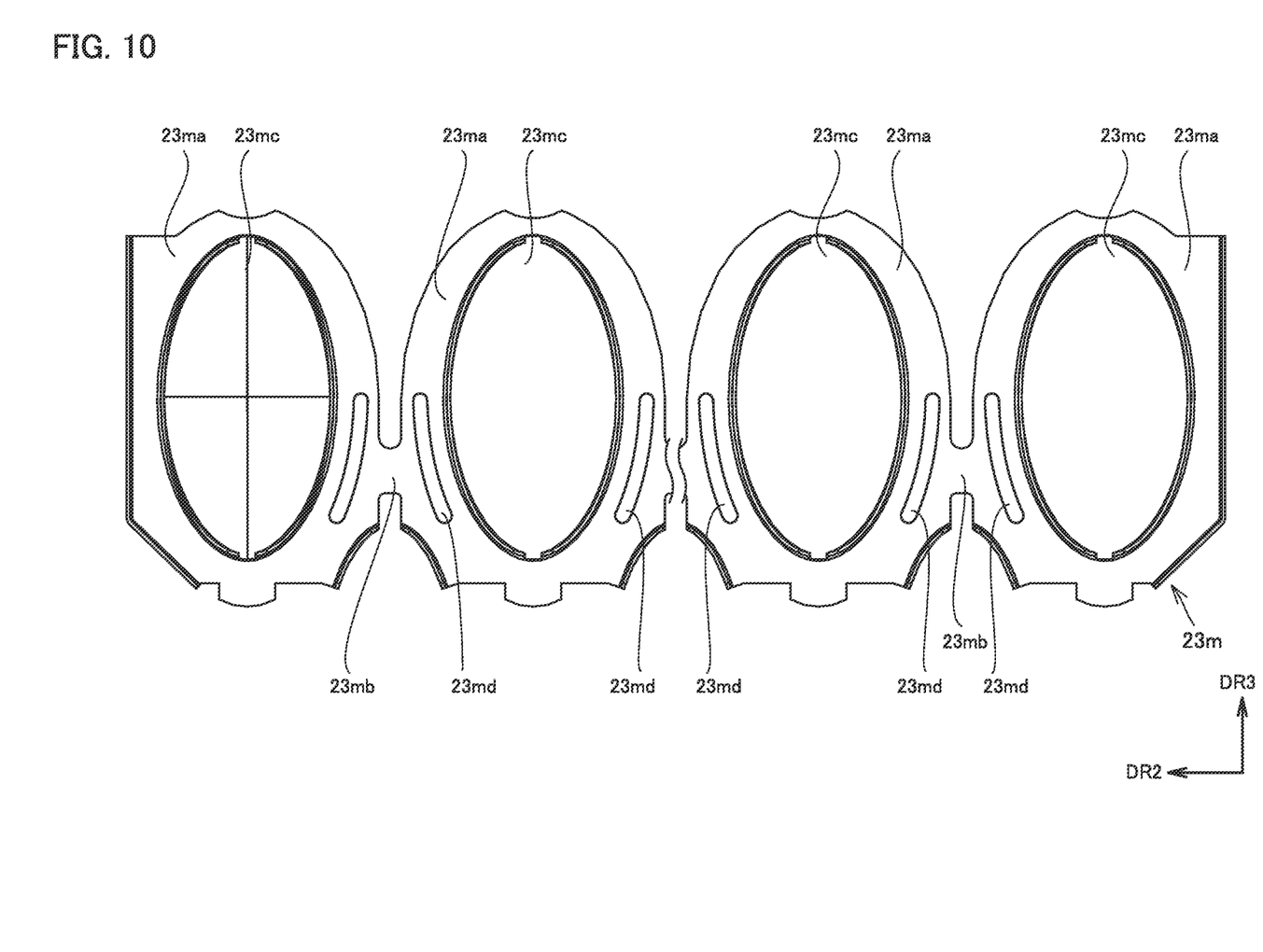
FIG. 10 is a plan view of fin 23m according to a third variation.

As shown in FIG. 10, through hole 23md may be in a curved shape. This curved shape is a shape along the edge of insertion hole 23mc (a shape parallel to the edge of insertion hole 23mc). In this case, the width of fin main body 23ma around through hole 23md can be made uniform. Thus, when fin main body 23ma around through hole 23md deforms due to the thermal expansion of bridging portion 23mb, cutting of fin main body 23ma around through hole 23md can be further suppressed.

Figure 11:
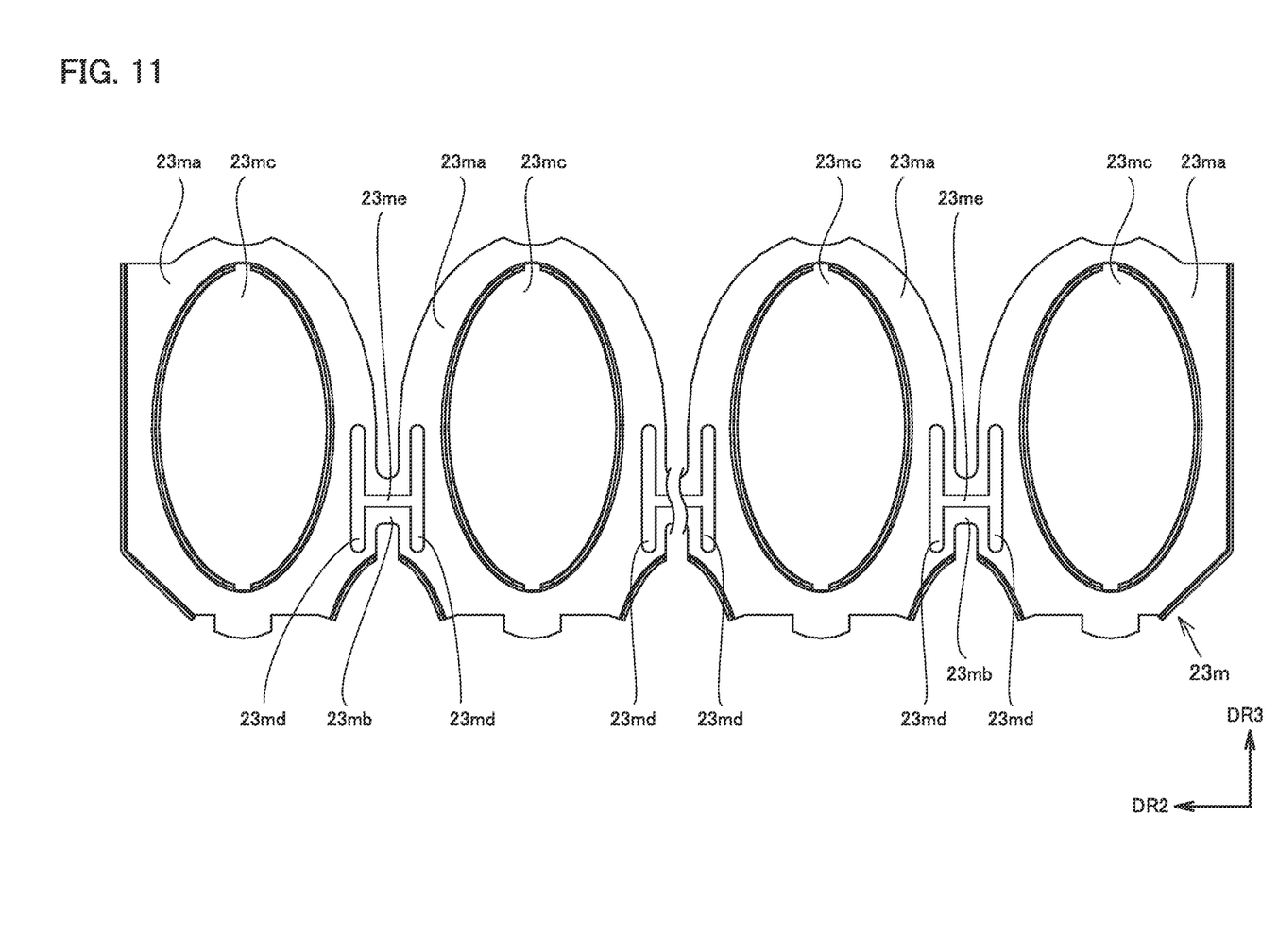
FIG. 11 is a plan view of fin 23m according to a fourth variation.

As shown in FIG. 11, bridging portion 23mb may be further provided with a through hole 23me. Through hole 23me passes through bridging portion 23mb in the thickness direction. Through hole 23me extends in second direction DR2. The pair of through holes 23md formed to face each other with bridging portion 23mb interposed therebetween may be connected to each other by through hole 23me. In this case, when bridging portion 23mb thermally expands, bridging portion 23mb itself tends to deform. Thus, the thermal expansion of bridging portion 23mb is less likely to be transmitted to heat transfer tube 23b, so that the thermal stress that occurs in heat transfer tube 23b can be further reduced.

Figure 12:
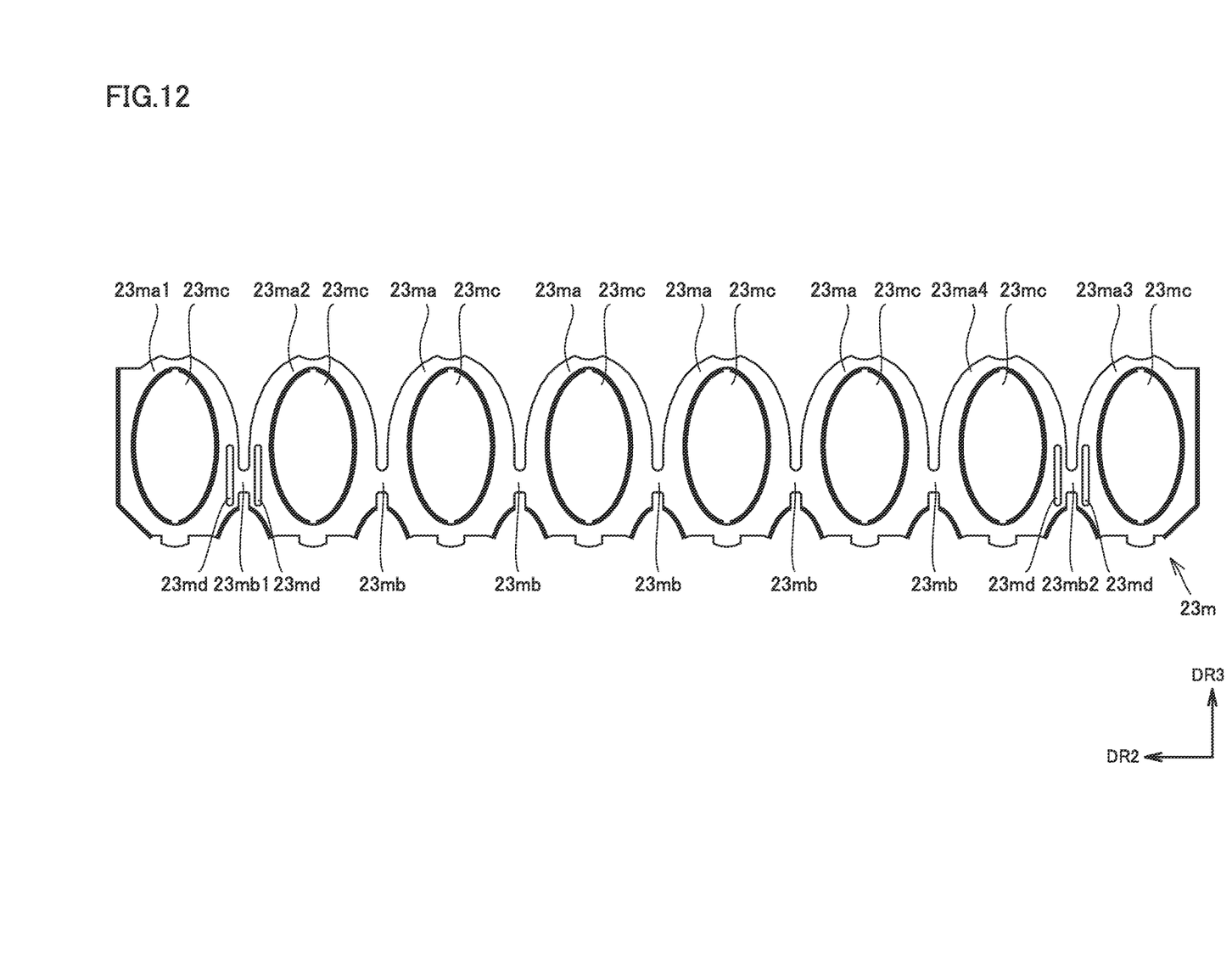
FIG. 12 is a plan view of fin 23m according to a fifth variation.

Fin main body 23ma located at one end in second direction DR2 is termed a fin main body 23ma1, and fin main body 23ma located at the other end in second direction DR2 is termed a fin main body 23ma3. Fin main body 23ma located next to fin main body 23ma1 is termed a fin main body 23ma2, and fin main body 23ma located next to fin main body 23ma3 is termed a fin main body 23ma4. Further, bridging portion 23mb connecting fin main body 23ma1 and fin main body 23ma2 is termed a bridging portion 23mb1, and bridging portion 23mb connecting fin main body 23ma3 and fin main body 23ma4 is termed a bridging portion 23mb2.

As shown in FIG. 12, a pair of through holes 23md are formed to face each other with bridging portion 23mb1 interposed therebetween, and a pair of through holes 23md are formed to face each other with bridging portion 23mb2 interposed therebetween. Through hole 23md is not formed next to bridging portions 23mb other than bridging portion 23mb1 and bridging portion 23mb2.

The thermal stress caused by the thermal expansion of bridging portion 23mb acts most strongly on heat transfer tubes 23b disposed at the ends in second direction DR2. By forming through holes 23md as described above, therefore, the thermal stress applied to heat transfer tubes 23b can be adequately reduced. In this case, the number of through holes 23md formed can also be reduced, so that a reduction in area of fin 23m due to the formation of through hole 23md and a corresponding reduction in heat transfer efficiency of fin 23m can be suppressed.

Although the embodiment of the present disclosure has been described as above, the embodiment described above can be modified in various manners. In addition, the scope of the present invention is not limited to the embodiment described above. The scope of the present invention is defined by the terms of the claims, and is intended to include any modifications within the meaning and scope equivalent to the terms of the claims.

INDUSTRIAL APPLICABILITY

The embodiment described above is applied particularly advantageously to a primary heat exchanger and a hot water apparatus including the primary heat exchanger.

What is claimed is:
1. A heat exchanger comprising:
a plurality of heat transfer tubes extending in a first direction and aligned in a second direction intersecting with the first direction; and
a plurality of fins disposed in the first direction,
the fins each including a plurality of fin main bodies aligned in the second direction, and a bridging portion connecting two adjacent ones of the fin main bodies, and
at least one of the fin main bodies being provided with a through hole next to the bridging portion in the second direction, wherein the through hole is located between one of the heat transfer tubes and the bridging portion.

2. The heat exchanger according to claim 1, wherein a pair of the through holes are formed to face each other with the bridging portion interposed therebetween.

3. The heat exchanger according to claim 1, wherein a width of the through hole in a third direction intersecting with the first direction and the second direction is greater than a width of the bridging portion in the third direction.

4. The heat exchanger according to claim 2, wherein a width of the through hole in a third direction intersecting with the first direction and the second direction is greater than a width of the bridging portion in the third direction.

5. The heat exchanger according to claim 3, wherein the through hole is in the form of a slit extending in the third direction.

6. The heat exchanger according to claim 5, wherein ends of the through hole in the third direction are curved when viewed in the first direction, and the curves are convex toward an outer side of the through hole.

7. The heat exchanger according to claim 1, wherein the through hole is in a circular shape or an elliptical shape.

8. The heat exchanger according to claim 1, wherein a pair of the through holes are formed to face each other with a first bridging portion interposed therebetween, the first bridging portion being the bridging portion located closest to one end of the fin in the second direction, and a pair of the through holes are formed to face each other with a second bridging portion interposed therebetween, the second bridging portion being the bridging portion located closest to the other end of the fin in the second direction, and the through hole is not formed next to the bridging portion other than the first bridging portion and the second bridging portion.

9. A hot water apparatus comprising:
the heat exchanger according to claim 1; and
a burner that generates combustion gas subjected to heat exchange by the heat exchanger.

* * * * *